(12) United States Patent
Clarkson

(10) Patent No.: US 12,241,868 B2
(45) Date of Patent: Mar. 4, 2025

(54) SYSTEM AND METHOD FOR EVALUATION OF A MATERIAL SYSTEM

(71) Applicant: UT COMP INC., Cambridge (CA)

(72) Inventor: Geoffrey Clarkson, Cambridge (CA)

( * ) Notice: Subject to any disclaimer, the term of this patent is extended or adjusted under 35 U.S.C. 154(b) by 267 days.

(21) Appl. No.: 17/891,897

(22) Filed: Aug. 19, 2022

(65) Prior Publication Data

US 2023/0011525 A1 Jan. 12, 2023

Related U.S. Application Data

(63) Continuation of application No. PCT/CA2021/050192, filed on Feb. 19, 2021.

(60) Provisional application No. 62/979,739, filed on Feb. 21, 2020.

(51) Int. Cl.
| | | |
|---|---|---|
| *G01N 29/11* | (2006.01) | |
| *G01N 29/06* | (2006.01) | |
| *G01N 29/07* | (2006.01) | |
| *G01N 29/34* | (2006.01) | |

(52) U.S. Cl.
CPC ......... *G01N 29/11* (2013.01); *G01N 29/0645* (2013.01); *G01N 29/07* (2013.01); *G01N 29/343* (2013.01); *G01N 2291/0231* (2013.01); *G01N 2291/0258* (2013.01)

(58) Field of Classification Search
CPC .... G01N 29/11; G01N 29/0645; G01N 29/07; G01N 29/343; G01N 2291/0231; G01N 2291/0258; G01N 29/30; G01N 29/4472; G01S 7/52036; G01S 15/8911
See application file for complete search history.

(56) References Cited

U.S. PATENT DOCUMENTS

| | | | |
|---|---|---|---|
| 10,481,131 B2 * | 11/2019 | Takahashi | G01N 29/043 |
| 2005/0150740 A1 | 7/2005 | Finkenzeller et al. | |
| 2016/0103101 A1 | 4/2016 | Clarkson et al. | |
| 2016/0363562 A1 * | 12/2016 | Takahashi | G01N 29/46 |
| 2018/0340858 A1 * | 11/2018 | Jahanbin | G01N 29/11 |
| 2020/0047425 A1 * | 2/2020 | Jahanbin | B29C 66/43441 |

OTHER PUBLICATIONS

PCT International Searching Authority; Written Opinion in corresponding PCT App. No. PCT/CA2021/050192; Apr. 14, 2021.
PCT International Searching Authority; IPRP on corresponding PCT App. No. PCT/CA2021/050192; dated Aug. 23, 2022.

(Continued)

*Primary Examiner* — Francis C Gray
(74) *Attorney, Agent, or Firm* — Amarok IP Inc.; Neil W. Henderson

(57) ABSTRACT

A system and method for evaluation of material systems including linings bonded to substrates, the system and method including: an ultrasonic transmitter configured to provide an ultrasonic pulse to the material system; an ultrasonic receiver configured to receive ultrasonic signal data related to the pulses; a data storage module configured to store data related to the material system, ultrasonic pulse and empirical data; an analysis module configured to analyze the ultrasonic signal data based on the ultrasonic pulse, the data related to the material system and empirical data; and an output module configured to output the results of the analysis.

12 Claims, 7 Drawing Sheets

(56) References Cited

OTHER PUBLICATIONS

Yonathan Sunarsa Timotius, Aryan Pouria, Jeon Ikgeun, Park Byeongjin, Liu Peipei, Sohn Hoon, "A Reference-Free and Non-Contact Method for Detecting and Imaging Damage in Adhesive-Bonded Structures Using Air-Coupled Ultrasonic Transducers", Materials, (Dec. 8, 2017), vol. 10, No. 12, doi:10.3390/ma10121402, p. 1402, XP055848775.

* cited by examiner

SYSTEM AND METHOD FOR EVALUATION OF A MATERIAL SYSTEM

RELATED APPLICATIONS

This application is a continuation of PCT Application No. PCT/CA2021/050192, filed Feb. 19, 2021, which claims priority from U.S. Provisional Patent Application No. 62/979,739, filed Feb. 21, 2020 which are hereby incorporated herein by reference.

FIELD

This application relates to a system and method for analysis of material systems and more specifically, analysis of polymer, reinforced composite materials or elastomer materials bonded to a substrate.

BACKGROUND

Metals and their alloys or other materials are often used in the construction of pipe, containers, tanks, pressure vessels and other structures where the application may involve exposure to physical and/or chemical conditions (service conditions) that will damage the structural material (substrate) and eventually render it unable to continue in service. In some of these cases, elastomeric, polymeric, composite materials or other materials may be applied as a lining or coating (lining) to the exposed surfaces to protect the substrate and produce a material system which provides increased resistance to the service conditions. Elastomers, such as rubber, have been used as linings on steel substrates, for example, since before circa 1900. Linings may also incorporate other materials and mixtures of materials such as polymers with reinforcements or fillers or other additives.

These linings are not normally used or applied where the polymer or elastomer would be exposed to mechanical forces that would cut, cleave, fray or shear the material, although these mechanical conditions might occur due to upsets or unplanned situations. The service conditions are typically those that will expose the overall lining surface to approximately similar conditions with the expectation that the lining will experience somewhat uniform damage.

In many cases, the lining is bonded to the substrate by adhesion. Many linings and the adhesives are also exposed to chemical and thermal conditions that cure the lining and adhesive, thus producing altered chemical and mechanical properties. The lining generally serves to protect the substrate and thus extend the operating lifetime of the material system.

In some cases, linings may be subjected to chemical and thermal conditions that promote chemical transformations such as cross-linking in the linings and thus increasing their performance against aggressive chemical or abrasive exposures. These transformation stages are known as curing.

When linings are installed onto the substrate and the curing cycle is considered complete, some inspection is required to determine whether the lining meets the installation requirements. Conventionally, the lining may be checked for small holes or potential leaks by applying a high voltage electrode to the lining surfaces so that a spark will travel to the grounded substrate along the defect, this is known as a spark-test. Another test measures the surface hardness of the lining to report the degree of cure of the surface. Flaws that exist below the surface, including: incomplete curing, poor bonding to the substrate, porous polymer, voids, foreign objects within the lining, and others, cannot usually be detected using the current practices, especially when the lining is opaque.

After going into service, although the lining extends the life of the substrate, the lining may be damaged by the service conditions, although generally at a slower rate than the substrate would be. It may be necessary to determine the extent of damage to the lining. In conventional situations, this is completed by inspecting the accessible surface and assessing the extent of damage from the visible appearance of the surface. Damage may occur as, for example:

Uniform damage where the thickness of the unaffected lining decreases over time (and the thickness of affected lining increases) due to degradation reactions from the service conditions. This type of damage may take several forms such as scission of chemical cross-links, cracking, abrasion, chemical reactions, and other changes;

Diffusion of the contained substance into the lining material;

Loss of thickness of the lining due to chemical reactions or abrasion; or

Other reasons.

Determining the extent of damage allows assessment of the lining and to determine when repairs or replacement are required. Non-destructive methods of testing do not damage the lining or result in repairs before the lining can be returned to service. Conventionally, non-destructive assessment of damage only uses visual inspection of the exposed surface, sometimes accompanied by some surface hardness testing and spark testing. Crack depth is usually assessed by: spark test, where an indication shows that immediate repair is required because the crack has perforated the lining; or by attempting to determine the depth using an object to measure the depth without damaging the intact lining. Both methods are subject to significant potential for error and can sometimes damage the lining and thereby need premature remediation.

In some cases for linings containing polymer or elastomer any damage to the polymer or elastomer may be characterized or measured in terms of changes to the mechanical properties of the polymer or elastomer. These changes are often identified in the literature using the term "creep". For example, diffusion of chemicals into the polymer might only cause minor damage to the polymer, but when the diffusion front reaches the substrate, the risk of damage to the substrate may be significant.

Inspections of linings often require that personnel enter into vessels or containers where harmful or life-threatening hazards might exist, posing significant risk to the personnel. In some cases, containers are too small to allow personnel entry. In these cases, inspection is not possible.

At present, decisions regarding the condition of the lining and any remediation that is required are usually based on interpretation and experience of individual inspectors.

In this situation, many defects in installation and/or the extent of damage from service conditions cannot be determined in an objective way. For example, without damaging the lining, it can be difficult to determine defects such as incomplete curing; poor bonding; porous polymer; voids; foreign objects; depth of damage; depth of cracks; diffusion of chemicals into the lining; thickness loss from the lining; or other issues. In order to investigate these items it may be necessary to conduct destructive testing such as cutting or perforating the lining, which can significantly reduce the protection provided by the lining.

When some types of substrate, such as metal, are used, ultrasonic techniques can be used to examine the structures.

Examination usually results in thickness measurement based on transit time of the applied ultrasonic pulse across the metal thickness and thus will allow detection of substrate that has been damaged as a consequence of leakage from damage to the lining. These inspections require that the ultrasonic transducer contact the surface of the substrate—usually the outer surface of a lined structure. However, the inspection method typically only detects substrate damage that has occurred after failure of the lining and does not identify developing damage in the lining.

Ultrasonic techniques have also been used to examine elastomers and polymers since the 1960's. Uses have included consideration of time for a short-period pulse to transit the material and attenuation of the pulse as it transits the material. Additional uses are the detection of gross inhomogeneity within specimens from blockage of the pulse within the material. For polymers, the literature has shown that damage mechanisms are detectable through analysis of combined signal attenuation and transit time while also considering changes in acoustic impedance that are detected.

Results reported to date have provided information on specimens made only of the elastomer or polymer and not of a system of materials as described above. Polymer and elastomer linings have much different acoustical properties than metals, with the result that normal ultrasonic methods and configurations only interrogate the material in contact with the transducer. For these systems of materials, new methods and configurations are required to allow evaluation of the material system.

Embodiments of the system and method described herein are intended to address at least one of the drawbacks of conventional systems of inspection, analysis, and evaluation of these types of materials.

SUMMARY

In a first aspect, the present disclosure provides a system to evaluate the condition of a material system comprising a lining bonded to a substrate, the system including: an ultrasonic transmitter configured to provide an ultrasonic pulse to the material system; an ultrasonic receiver configured to receive ultrasonic signal data related to the pulses; a data storage module configured to store data related to the material system, ultrasonic pulse and empirical data; an analysis module configured to analyze the ultrasonic signal data based on the ultrasonic pulse, the data related to the material system and empirical data; and an output module configured to output the results of the analysis.

In some cases, the system includes a filter module to extract relevant data from the ultrasonic signal data. In this case, the relevant data may include data associated with the lining and substrate being tested. The relevant data may include magnitudes of reflections from various locations where lining and substrate properties vary. The relevant data may include the relative time at which a reflection magnitude occurs.

In some cases, the data storage module may be configured to contain specific data relating to the ultrasonic velocity that should be expected for individual materials that may be part of the lining and substrate that is tested. The data storage module may be configured to contain specific data relating to the transmission of ultrasonic pulses within individual materials that may be part of the lining and substrate that is tested. In some cases, the data storage module may be configured to contain specific data relating to the effect of substances in contact with the opposite surface of the lining and substrate.

In some cases, the analysis module may be configured to determine the sonic velocity of the material between two interfaces in the material system. In some cases, the analysis module may be configured to determine the changes in ultrasonic signal magnitude that occur as the ultrasonic pulse transits the material between interfaces. In some cases, the analysis module may be configured to determine the effect of a substance in contact with the opposite surface of the lining and substrate. In some cases, the analysis module may be configured to determine the fraction of an ultrasonic pulse that has been transmitted across an interface. In some cases, the analysis module may be configured to determine the depth of damage that has occurred to a polymer lining on a substrate. In some cases, the analysis module may be configured to determine a value that is related to the condition of the polymer lining. In some cases, the analysis module is configured to update the data storage module.

In some cases, the output module may be configured to provide data related to the depth of damage to the polymer in a lining or related to the condition of the polymer lining. In some cases, the output module may be configured to provide data in a digital format for use by computer programs.

In another aspect, the present disclosure provides a method to evaluate the condition of a lining bonded to a substrate, the method including: taking ultrasonic signal data from the substrate or the lining, receiving the ultrasonic signal data, at an ultrasonic receiver; storing data related to the ultrasonic signal data in a storage module, such as: values for parameters that are required for use in data analysis, values for parameters that may be been determined for a particular specimen of substrate and lining and the like; analyzing the ultrasonic signal data, at an analysis module, based on the ultrasonic signal data and the data related to the ultrasonic signal data; and displaying the results at an output module.

In some cases, the method may include filtering the ultrasonic signal data to extract relevant data from the ultrasonic signal data, such as magnitudes of reflections and their relative times from various locations where lining and substrate properties vary.

In some cases, the analysis includes: extracting values from each signal, assembling the values into a function, identifying unknown parameters related to the materials in the particular specimen, using values provided by the data storage module as part of the calculations to find real values of the unknown parameters that will provide a real numerical solution of the function that corresponds to the processed ultrasonic signal data, evaluating the distribution of results after parameters have been calculated for all ultrasonic signals provided by the processing module, and adjusting parameters as required so that the results and parameters are distributed in a manner that is representative of empirical distributions.

In some cases, the method may determine the changes in ultrasonic signal magnitude that occur as the ultrasonic pulse transits the material between interfaces. In some cases, the method may determine the effect of a substance in contact with the opposite surface of the lining and substrate. In some cases, the method may determine the fraction of an ultrasonic pulse that has been transmitted across an interface. In some cases, the method may determine the depth of damage that has occurred to a polymer lining on a substrate. In some cases, the method may determine a value that is related to the condition of the polymer lining. In some cases, the method may provide data related to the depth of damage to the polymer in a lining. In some cases, the method may provide data related to the condition of the polymer lining.

In some cases, the method is implemented as a computer program provided on a special purpose or generic computer for executing the method and using data in a digital format.

Other aspects and features of the present disclosure will become apparent to those ordinarily skilled in the art upon review of the following description of specific embodiments on conjunction with the accompanying figures.

BRIEF DESCRIPTION OF FIGURES

Embodiments of the present disclosure will now be described by way of example only, with reference to the attached Figures.

DETAILED DESCRIPTION

Figure 1:
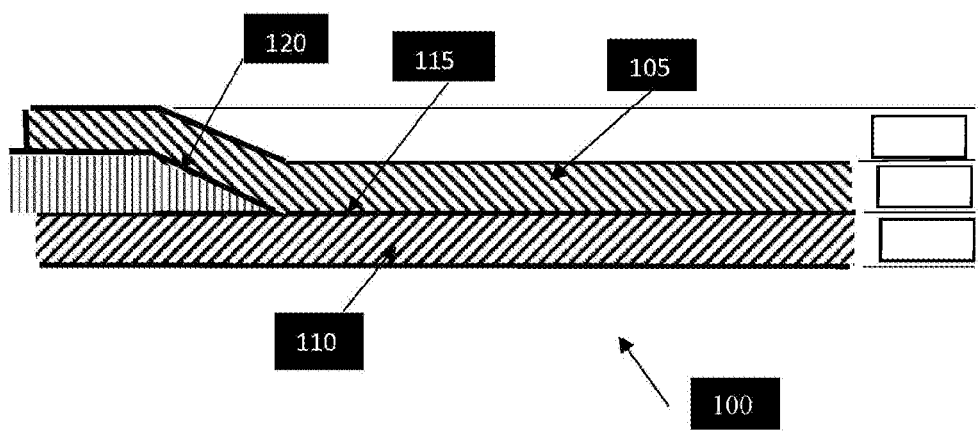
FIG. 1 is a schematic section view of a polymer or elastomer lining bonded to a substrate.

FIG. 1 illustrates a material system 100 including a lining 105 applied and bonded to a substrate 110, where the substrate 110 is in contact with the lining 105. The lining 105 and substrate 110 are typically bonded by an adhesive at the bond-line 115. The thickness of the substrate 110 is given by the variable ts and the thickness of the lining 105 is given by the variable tl. In FIG. 1, where adjacent applied sections of the lining 105 meet, an overlap 120 of lining is used to seal the edge and the thickness of the overlap has a thickness 108 given by variable tb.

Experience with material systems having elastomer or polymer linings on substrates has successfully shown that physical and chemical changes occur to the lining as a consequence of the service conditions. The service conditions describe the physical conditions that the lining is exposed to, including: chemicals and chemical compounds; temperatures; pressures; radiation; mechanical forces; abrasion; and others.

Figure 2:
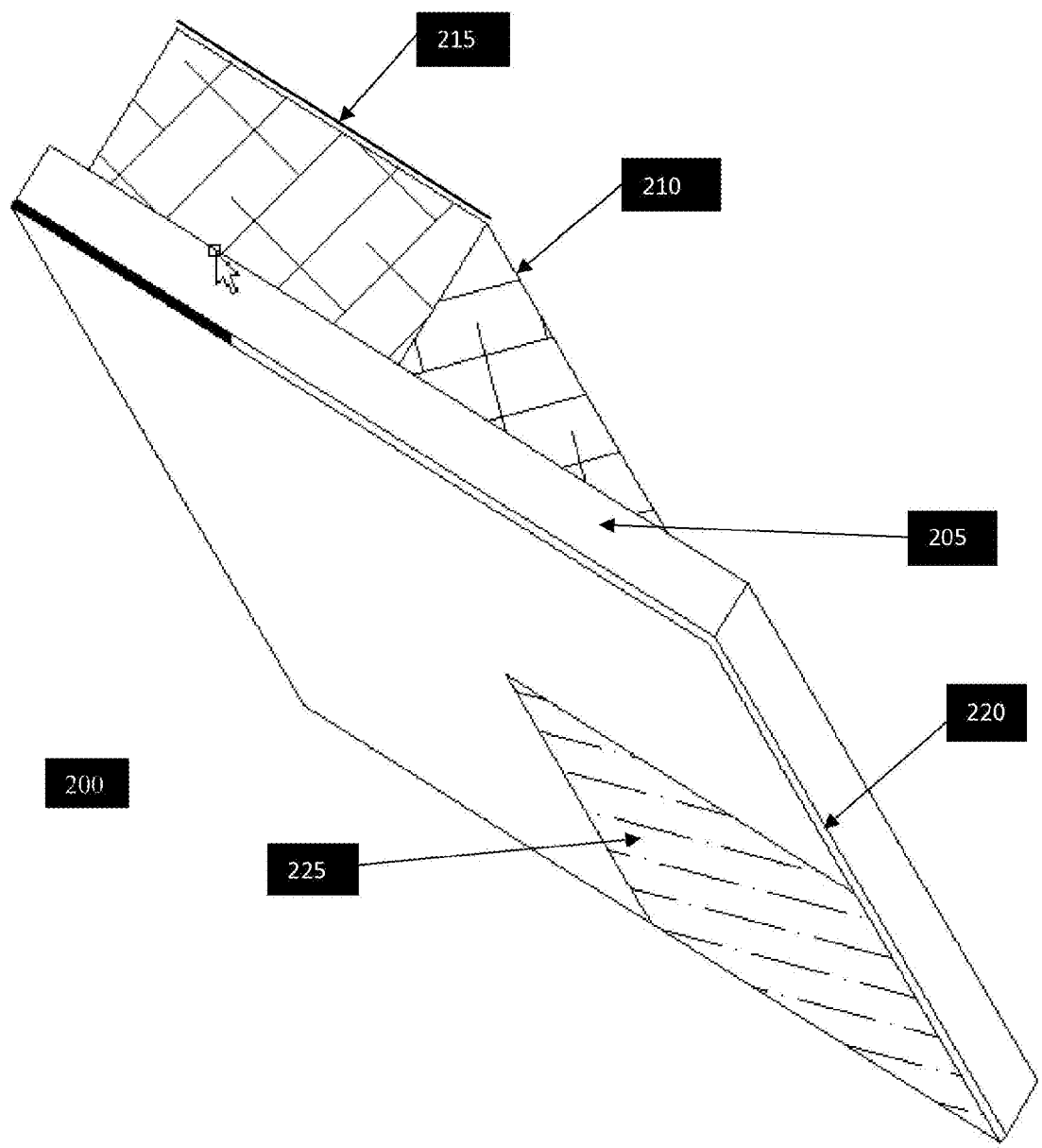
FIG. 2 illustrates a material system for providing a comparative baseline or a reference for the ultrasonic analysis of a polymer or elastomer lining bonded to a substrate.

FIG. 2 illustrates an example of a material system 200 for providing comparative reference or initial condition data for a polymer or elastomer lining on a substrate. The material system 200 is intended to be assembled at the same time and from the same constituent materials and using the same methods as the material system to be evaluated. The material system 200 should be configured so that it remains with the asset containing the material system to be evaluated but it is generally not exposed to the same service conditions, thus allowing the material system 200 to be a reference for the "as new" condition of the material system to be evaluated. The material system 200 includes substrate 205 of the same material and the same thickness as the substrate in the material system to be evaluated. Bonded to the substrate sample 205 is a lining 210 that has the same composition, adhesive system, curing conditions and thickness as the lining in the material system to be evaluated. The lining 210 is bonded to a portion of (e.g. about 50%) of the major surface area of the substrate 205. In the particular case where information may be required about the lining in isolation from the substrate, the lining 210 may also include a similar area of material that is not bonded to the substrate 205. After the lining 210 has been successfully applied to the substrate 205 and cured, a protective coating 220 can be applied to all surfaces that would not be damaged by the coating 220. If the coating 220 could damage the lining 210, then an alternative protective coating 215 can be applied to the lining. The coating 220 should be the same material composition and thickness as used on the substrate of the asset using the material system to be evaluated.

In general, materials may be considered the same material if they are made to some standard or specification, so the thickness tolerance would be equivalent to the tolerance provided in the design, drawing or specification. If a specification is not available, then the thickness of the material should be within ±15% of the thickness measured from the material system to be evaluated. In the case of materials, the materials used for the item in FIG. 2 is intended to be of the same standardized grade and specification as the material system to be evaluated.

After the assembly is complete, a label 225 can be applied or attached to the substrate indicating, for example, the substrate material and thickness; the lining material with composition, curing conditions, and thickness; the month and year that the material system was assembled; the minimum recommended temperature; and other information as may be desirable.

The material system 200 can be used to assist with evaluation of the current condition of the actual material system (combination of substrate and lining material) that is exposed to the service conditions. In some cases, the reference system can be kept with the actual system, and may be exposed to service conditions or only exposed to ambient conditions, such as the weather, depending on the situation. Ultrasonic readings taken from the material system 200 can provide direct information on parameter values to be used in the evaluation of the material system that has been in use. The reference system can be measured at the beginning of life and can also be used as a comparison, particularly if it has been in the environment of the test sample and/or subject to service conditions.

In other cases, the material system 200 may not be exposed to the service conditions of the actual material system. When the material system is not exposed to the service conditions, then the material system 200 serves as a reference of the "as new" condition of the material in "perpetuity". Even when not exposed to the service conditions, the intent is to maintain most of its physical dimensions with reference to the actual material system.

The basis of making an evaluation is to compare the existing condition and material status of the system at the time of an inspection with both the condition that existed before the material system was exposed to the service conditions and the defined end of serviceability condition for the lining. It is hypothesized that the end of serviceability for the lining can be defined and superposed onto the material system 200, as is defined in, for example U.S. Pat. No. 9,989,502 by Geoff Clarkson, which is hereby incorporated herein in it's entirety.

Figure 3:
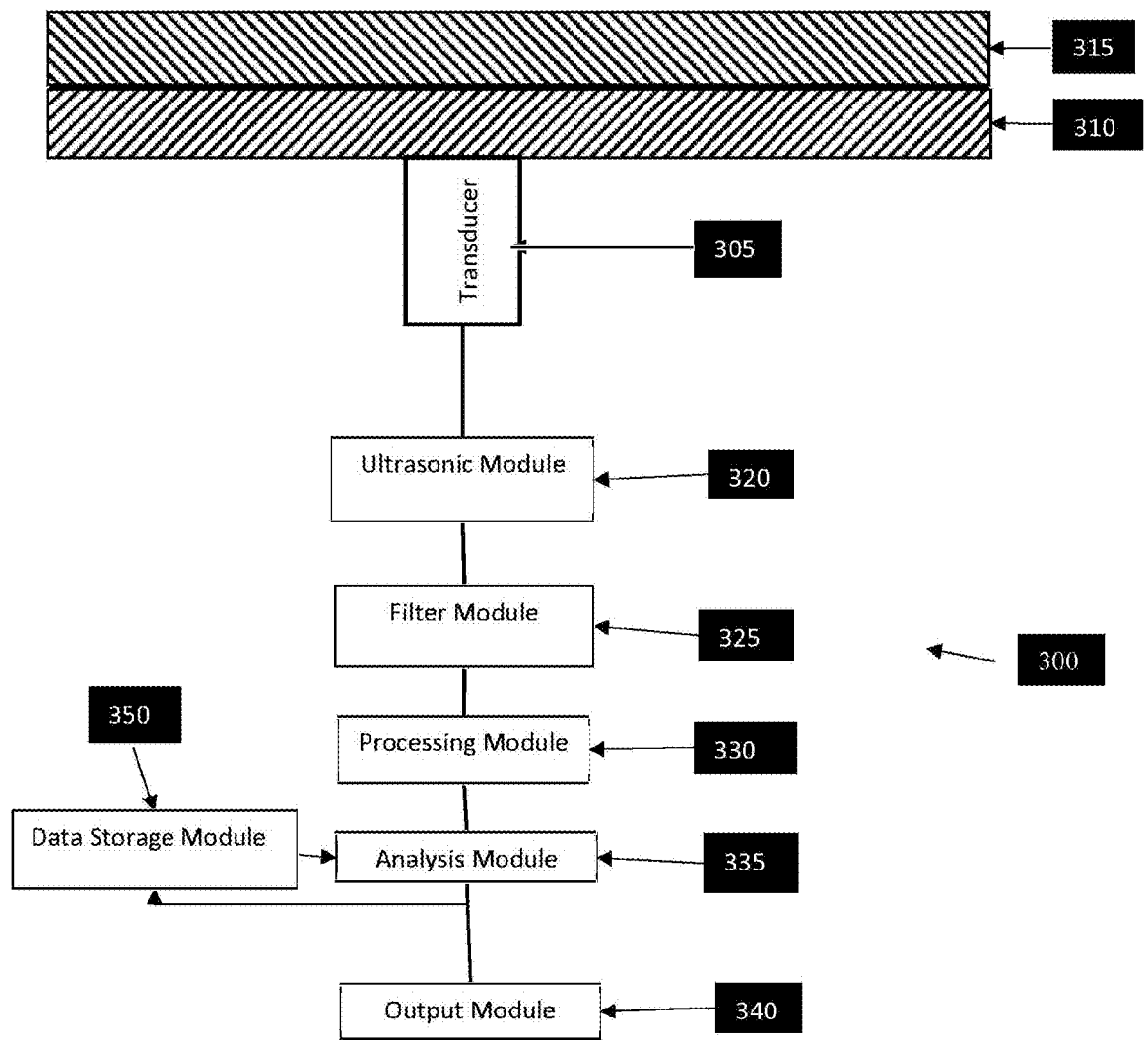
FIG. 3 illustrates an embodiment of a system for analyzing polymer or elastomer lining on a substrate.

FIG. 3 illustrates a system 300 for analyzing a material system according to an embodiment herein. In FIG. 3, two materials are shown, 310 and 315. For this example, the substrate could be item 310 and the lining 315 or alternatively, the lining could be 310 and the substrate 315.

The system 300 includes an ultrasonic transducer 305 configured to provide ultra-sonic pulses to materials 310 with 315 bonded to its opposite surface. The ultrasonic transducer 305 may be configured to receive readings, or ultrasonic signal data, and transfer readings to an ultrasonic module 320. In other cases, the ultrasonic module 320 may be configured to receive the ultrasonic readings directly.

The system 300 may include a filter module 325 configured to filter the ultrasonic readings. The system 300 includes a signal processing module 330, which is configured to process the ultrasonic readings prior to the analysis of the readings. In some cases, the filter module 325 and signal processing module 330 may be a single module. The output of the signal processing module 330 could take the form of a locus of points plotted on a Cartesian plane. This is generally known as an A-scan plot.

It is intended that the filter serves to identify features in the data that correspond to signal passage and reflection at material interfaces. The processing may determine aspects such as magnitudes and times of reflections within the reading. In some cases, a single reflection contains information from several overlapping reflections.

The system 300 includes an analysis module 335 configured to analyze the ultrasonic readings. The analysis module 335 is configured to process the ultrasonic signal data, calculate characteristic values based on the processing of the ultrasonic signal data, compare the characteristic value to a baseline established for the characteristic values which may be stored in the data storage module 350, and determine the extent of wear or damage to the material system based on the comparison. The analysis module 335 may also determine the extent of lining or substrate damage that may have occurred. The normal characteristic value reported by the calculations is the extent of damage that has occurred to the system 300. An output module 340 may be configured to provide the results of the calculation, for example to a computer program or to a report.

The data storage module 350 may be configured to store a plurality of data values that may be relevant to analysis of various material systems. The data storage module 350 may also retain historical data relating to application of the system, including values that have been determined using statistical methods for parameters such as; sonic velocity, material density, attenuation of ultrasonic pulses, and others. The data storage module 350 may also be configured to receive data from a current analysis.

Evaluation of polymer or elastomer linings, especially where life prediction is desired, will ideally use non-destructive methods that can verify the rate of change of the condition of the polymer. With availability of reliable non-destructive methods, regular evaluations can be completed to monitor objective changes that have occurred to the lining.

Research has shown that changes in the response of polymer or elastomer materials to ultrasonic excitation can correlate to damage to the elastomer or polymer. However, in the material system shown in FIG. 1, it is necessary to isolate the appropriate ultrasonic response to each of the materials in the system, based on detected responses from ultrasonic excitation. It is also necessary to identify changes that have occurred within the materials in the system.

Figure 4:
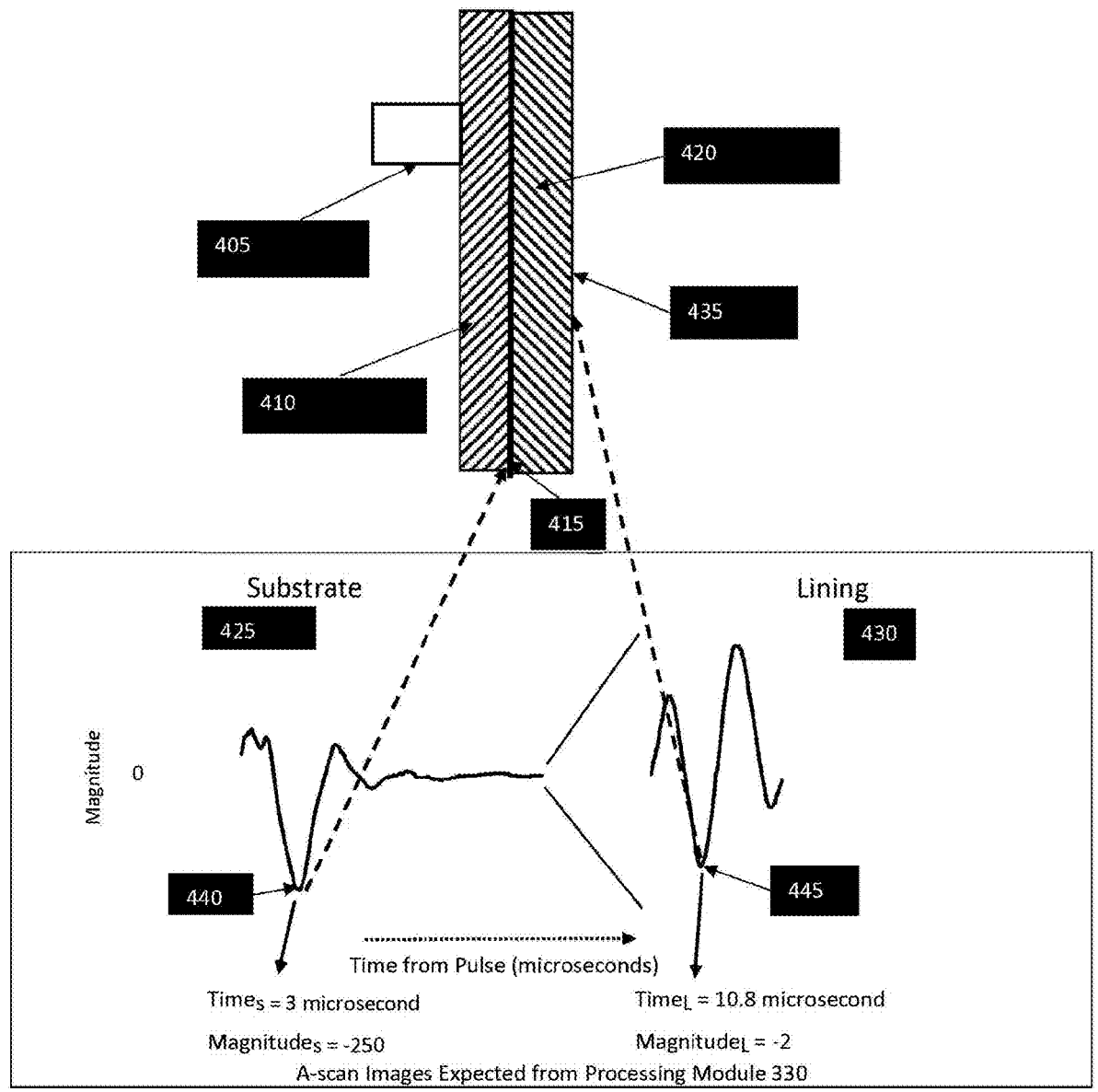
FIG. 4 illustrates an embodiment of ultrasonic transducer taking readings and the display after processing.

FIG. 4 illustrates a non-destructive ultrasonic inspection of a lining on a substrate. An ultrasound transducer 405, such as the transducer 305 of the system shown in FIG. 3, is coupled to the substrate 410 and an ultrasonic pulse is applied to the substrate by the transducer. The ultrasonic pulse transits the substrate 410 until it encounters the interface 415 of the substrate 410 and the lining 420, along with a corresponding change in acoustical impedance. Differences in material properties such as density and the speed of sound through the materials 410 and 420 may generate a reflection that may return through 410 to 405. The chart 425 shows a pulse for this example. The reflection appears as 440 and some of the ultrasonic pulse may subsequently pass through the interface 415 and enter 420. This transmitted impulse will transit 420 until it is reflected by the free surface 435 whereupon it transits back through 420, across bond 415 and through 410 to be received by 405. This reflection may appear somewhat like 445 in chart 430. The processing module 330 from FIG. 3 will display graphical plot images of signal magnitude versus time from the ultrasonic pulse application, known as A-Scans, similar to those shown by charts 425 and 430

The coordinates of the features in charts 425 and 430 are plotted using time from pulse application on the horizontal axis and the magnitude of the signal received on the vertical axis. Time and magnitude are independent and orthogonal variables.

The charts 425 and 430 in FIG. 4 show the appearance of the ultrasonic A-scan plots for the particular situation where the acoustical impedance of 410 is higher than that of 420 and 420 is ultrasonically coupled to 410. Three other situations can occur where the A-scan plot display from processing module 330 will be different.

In the case where 410 has lower acoustical impedance than 420 and 410 is coupled ultrasonically to 420, the A-scan plot image 425 for 420 may appear as mirror image about the horizontal axis to the displayed plot that is shown in 425. In another case, where 410 has lower impedance than 420 and 420 is not coupled to 410, the displayed A-scan plot image from processing module 330 for the interface may appear as shown in 425 and the image 430 will not display because the signal will not cross the interface. In the case where the acoustical impedance of 410 is the same as that for 420 and the interface is bonded, the displayed image 425 from processing module 330 may not show any reflection from the interface since there will be no difference in acoustical impedance as is required to create a reflection.

FIGS. 5a to 5d illustrate the appearance of graphical representations for features that may appear from the Processing Module 330 in FIG. 3. All illustrations in the figure represent readings that have been taken from the substrate surface, with the direction of pulse travel starting at the left side and moving to the right until reflecting from the free surface then traveling left to the receiver.

Figure 5:
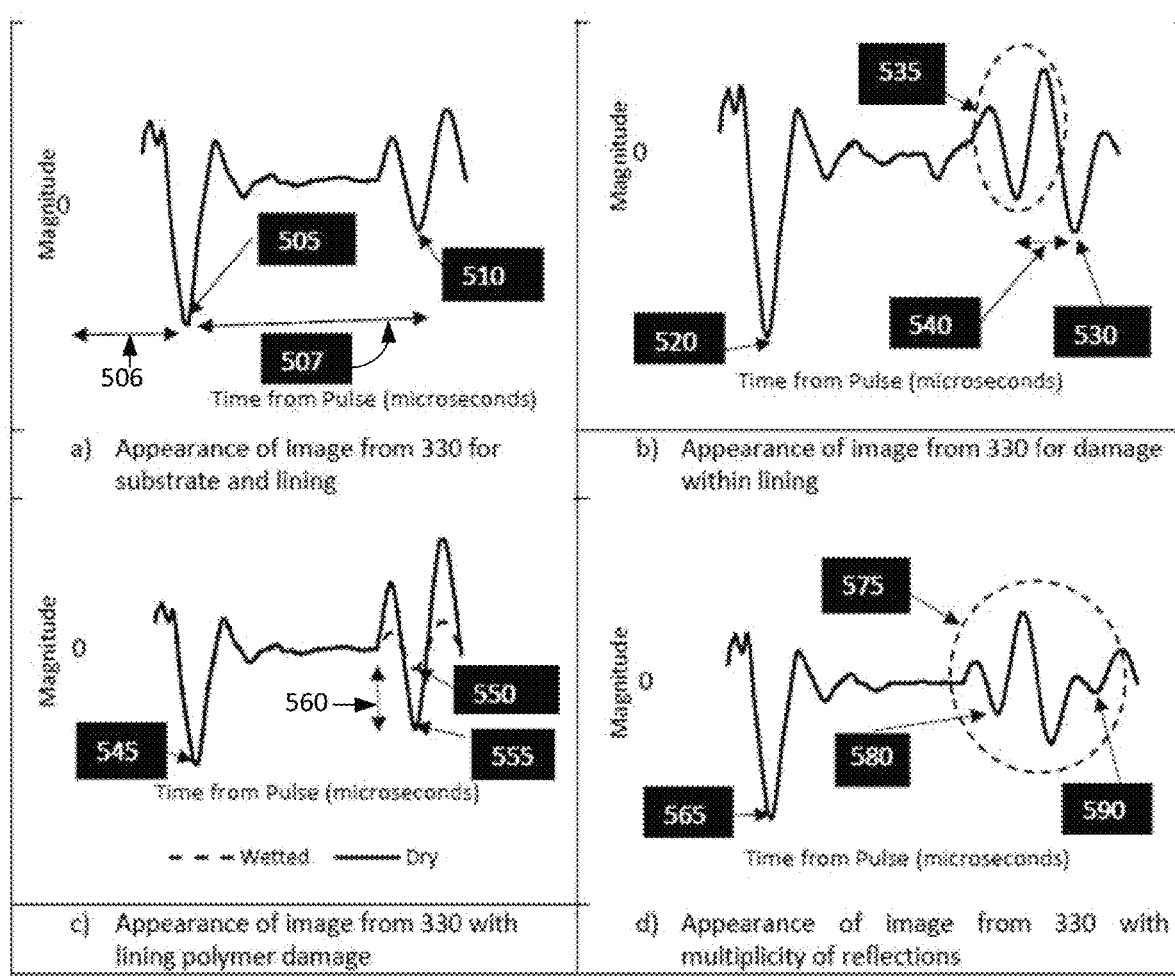
FIG. 5 illustrates embodiments of various outputs from the output module.

FIG. 5a shows a schematic of the appearance of a processed A-Scan for a reading taken from a substrate through to an attached/adjacent lining. The A-Scan shown in FIG. 5a is similar to what should be expected for lining on a substrate in comparatively new condition, as should be provided from system 200 shown in FIG. 2. In this case, the ultrasonic reflection from the substrate-to-lining interface (415 in FIG. 4) 505 and the reflection at the free inner surface of lining (435 in FIG. 4) 510 are illustrated. The time from signal application, or transit time, to feature 505 is shown as time 506 and the time between feature 505 and feature 510 is shown as time 507. In this case the intermediate zone (i.e. during time 507) between features 505 and 510 is relatively smooth relative to the bounding of features 505 and 510.

FIG. 5b shows an example of an A-Scan of a reading taken where damage has occurred within the lining. The reading information associated with the damage occurs between the interface reflection 520 and the lining surface reflection 530. In this figure, the circled area 535 shows the plotted values associated with the damage. The depth of the damage is generally proportional to the time span 540.

The condition of a polymeric or elastomeric material can be characterized using quantitative values obtained from its response to ultrasound. Damage to polymers is exhibited in the response from the time for the pulse to transit the material, changes to the velocity that an ultrasonic pulse moves though the material, the attenuation of the applied signal that occurs across the material, and others. As one illustration, some evidence of these changes could be visible in the chart 430 shown in FIG. 4. Referring to 425 and 430 for 420 as lining on 410 as substrate, these parameters can be determined from solution of equation 1 for each of 440 and 445.

FIG. 5c shows an example where two readings from the same approximate location have been superposed on the same plot. The reading shown as the broken line represents a reading that was taken while liquid was against the opposite surface (Wetted) and the reflection from surface 435 appears as 550. The difference 560 between the 555 and 550 can be characterized by a factor that has been termed Opposite Surface Correction Factor (OSCF).

Use and determination of OSCF is given by equations 1 and 2:

$$\text{Difference } 560 = OSCF \times \text{Value of } 550 \quad (1)$$

$$\text{Where: } OSCF = \frac{\text{Value of } 555}{\text{Value of } 550} - 1 \quad (2)$$

Solution of equations 1 and 2 generally require a pair of ultrasonic readings that have been taken where the opposite surface is wetted then non-wetted. In analysis module 335, estimates of approximate OSCF values may alternatively be available from data storage module 350 in situations where comparative readings 555 and 550 may not be available. In a similar way, where readings 550 and 555 are available, the calculated OSCF value may be added to the data storage module 350 to be used as a future reference.

FIG. 5d shows an example of a reading taken where a multiplicity of features occur as shown by the circled area 575. Within the circled area 575, two "spikes" 580 and 590 are labeled. This type of feature within a reading usually shows that a portion of the applied signal has been reflected back to the receiver before it reaches the surface of the lining. When these multiple reflections appear within a polymer, two explanations are generally possible. The first and conventionally accepted explanation is that there could be a discontinuity in the material, such as a foreign object or a void or material separation and the second is that there has been some form of change in the sonic impedance of the material at each indication. For materials including polymers, it is common for conventional analysis to classify these situations as a "delamination" which is a term used to describe a location where a material discontinuity has occurred.

As a polymer or elastomer becomes damaged, the response of the material to ultrasound is generally altered in a measurable and quantifiable manner. Quantities can be calculated from the output of the processing module 330 that correspond to the changes that have taken place in the polymer. One example of such a parameter uses signal attenuation and the time for the ultrasonic pulse to transit the full thickness of the material. This solution has been made available by empirical methods. The rate of change for the polymer can be determined from the changes detected from the ultrasonic response and incorporating the duration of time that the polymer has been exposed to service conditions. The rate of change can then be used to predict the time remaining until the lining damage reaches a predetermined threshold or value. The predetermined value is often considered to be the "end of life", or the point where the polymer is no longer able to fulfill its designed function. Usually this situation exists before failure and allows remedial action before failure. The threshold or value may vary depending on the application and the degree of tolerance that is in use. In some cases, the threshold may be related to the detected depth of damage, to the remaining thickness or other property of the lining, or the like or a combination of these measures.

The magnitude values for reflection "k", such as 440 or 445, where 440 corresponds to k=1 and 445 to k=2, can be represented as in equation 3, below, for reflections in a single ultrasonic A-Scan.

$$\text{Magnitude}_k = (\Pi f_i A_i{}^{t_i} T_{i-1,i} T_{i,i-1}) R_{i,i+1} (1+OSCF_k)^{-1} \quad (3)$$

In equation 3:
0<i≤k, where i corresponds to a detected interface
$f_i \equiv (0 \leq f_i \leq 1)$ fraction of area at interface i that transmits ultrasound
$A_i \equiv$ Ultrasonic energy transmission factor through the material preceding i
$t_i \equiv$ time for the ultrasound pulse to transit the material that ends at interface i
$T_{a,b} \equiv$ Magnitude of ultrasonic energy transmitted across interface from a to b,
$R_{a,b} \equiv$ Magnitude of ultrasonic energy reflected from interface a to b
$OSCF_k =$ the OSCF value used for the reflection.

For example, referring to 425 and 430 for 420 as lining and 410 as substrate, these parameters can be determined from solution of equation 3 for 445. The values for "T" and "R" cannot be determined directly from the ultrasonic reading but can be calculated using information about the materials used for the substrate and lining obtained via, for example, the data storage module 350 and processing module 330.

When the materials system is comprised of isotropic materials with uniform densities the "T" and "R" values may be expressed as functions of sonic velocity and mass density of the individual materials. When the material system includes polymers that may be reinforced or mixed with materials such as glass fibers, carbon fibers, sand particles or other materials, it is generally recognized that the functions for isotropic materials may not apply. Those skilled in the art will be able to identify circumstances where the functions for isotropic materials may not adequately define the "T" and "R" values. In these circumstances, empirical data from past readings may provide a value or a range of values that could be used. Possible values that "T" and "R" may have may also be constrained by force balance within the substrate and lining material system.

Figure 6:
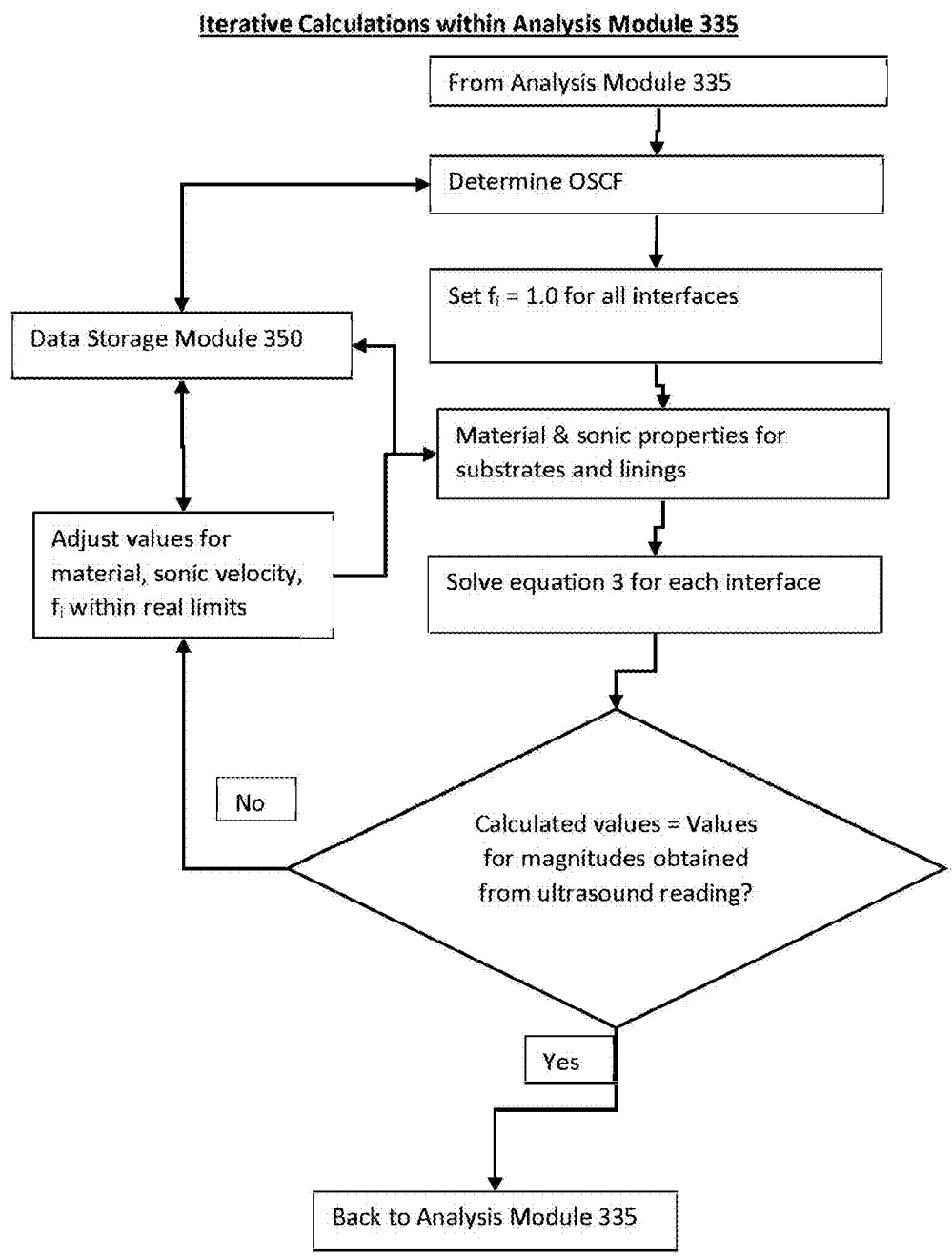
FIG. 6 illustrates embodiments of a method for analyzing polymer or elastomer lining on a substrate (via the analysis module).

For solution of equation 3, a single ultrasonic reading does not generally provide enough information for closed form solution in any circumstance where there is a lining on a substrate. In fact, a multiplicity of ultrasonic readings will also generally not provide enough data to allow closed-form solution of any system of simultaneous equations of the form of equation 3. As such, FIG. 6 shows a flowchart of an example solution method 600 that may be used for equation 3. As shown in the figure, using the data storage system 350 and any other data that might be available for the material system, equation 3 can be decomposed to separate the effects of each component.

In particular, FIG. 6 illustrates an iterative calculation within the analysis module 335. At 605, the analysis module 335 begins the calculations. At 610, an OSCF is determined or retrieved from the data storage module 350. The analysis module is configured to set $f_i$ to 1 for all interfaces, at 615. At 620, the analysis module reviews the material and ultrasonic properties for the substrate and linings. At 625, the equation 3 is solved for each interface by the analysis module 335. At 630, it is determined if the calculated values are equal to the magnitudes obtained from the ultrasonic reading. If yes, the calculations may be completed, at 635. If no, the values for material, sonic velocity and $f_i$ may be adjusted at 640 and the process may iteratively continue.

There are several cases where both the substrate material and the lining material may provide responses to ultrasonic pulses that have been applied. In any of the following cases, if the solution of equation 3 provides values for properties of the materials that are not reasonably similar to values that are, for example, within predetermined ranges (for example, known and/or saved in data storage module 350), then the solution can be expanded to include other combinations of properties. If a closed solution is not possible using properties that are reasonably similar to known and/or saved values, then a discontinuity may be assumed and a solution sought by assigning a value less than 1 to the factor that models the fraction of area ("f" in equation 3) that transmits the ultrasound. Normally, it is acceptable to find a solution that provides a maximum value of f using values for the other parameters in the equation based on the material system being studied. Generally speaking, the variable "T" in the equation can have a value greater than 1 but other variables will be less than or equal to 1.

In the case where the mass density of the substrate and the lining may be close to each other, a reflection such as 505 may not appear. In this case, if the sonic velocity of the substrate or lining changes as a result of external factors, then the reflection will typically occur and any features such as 505 may be attributed to sonic velocity differences in the materials due to the external factors. Solution of equation 3 may be completed for the signal applied to either the substrate or the lining.

In the case where the mass density of the substrate may be much greater than the mass density of the lining, solution of equation 3 incorporating both the substrate and lining may be completed when the ultrasonic signal is applied to the substrate.

In the case where the ultrasonic signal is applied to a substrate with significantly lower mass density than the lining, solution of equation 3 may be limited to the lower density material up to and including the interface. As an example, only one interface may be detected in the A-scan and thus only one solution of equation 3 would generally be required.

The methods to find solutions to equation 3 for several different example configurations are described below. One of skill in the art will be able to apply the method and system herein to other configurations based on the examples described herein.

Generally speaking, if a solution to equation 3 is not possible for a reading, the material of the substrate or lining may have been damaged to the degree that it no longer accepts or transmits ultrasonic pulses. In these cases, it may be necessary to determine if the substrate and lining system has been damaged too severely to continue operating, if remediation is required or if some other interpretation may provide the solution.

In situations where solutions to equation 3 are not found, parameters can be calculated from the readings and stored in the data storage module 350 to provide data that may assist with future circumstances that may be similar.

For the condition where a reference sample as in FIG. 2 is available and the ultrasonic signal is applied to a substrate which has higher mass density than a lining, the following general method may apply.

1. The ultrasonic transducer and instrumentation will be used with appropriate pulse width and excitation frequency to transit the substrate and subsequently transfer into the lining material. The goal of the pulse is to detect alterations that occur to the signal as the signal passes through the substrate and lining as well as information added to the signal from discontinuities and variations within the material system.
2. Ultrasonic readings can first be made on the reference sample from FIG. 2 (or alternatively, previously saved readings may be recalled). Generally speaking, readings from both the area covered by lining and not covered by lining will be made. As noted in the description relating to FIG. 2, surfaces of the reference sample will normally be tested in air with no wetting. In this case, an OSCF value of 0 is assigned. Readings may appear as in FIG. 4 where the time and magnitudes for the interface reflections 440 and 445 are used to provide a solution to equation 3. Because the materials used in the system are provided, equation 3 can be used to provide values for the $A_i$ components with the assumption that $f_i$ is 1.0. For the particular case where a reading from the section with no lining is available, the value of A for the substrate can generally be determined directly.
3. Ultrasonic readings will then be taken from the substrate to be tested in a multiplicity of locations. In some cases, a number of readings may be taken at each location but this is generally not required. This can be used in the other examples herein as well.
4. The readings from tested substrate and lining will provide values that can be entered into equation 3. Generally, the following assumptions apply: the "A" value (shown as $A_i$ in equation 3) for the substrate will remain constant and the "A" value for the lining will be expected to change, and the "T" and "R" values may change as a result of changes that may occur to the sonic velocity of the lining. In this way, the reference sample can be used to assist with quantifying changes that have occurred to the tested substrate and lining. The results will include current thickness of the lining, depth into the lining that damage has occurred and the magnitude of damage that has occurred. For example, this methodology relates to FIG. 5*a* when taken from the reference sample 200:
    a. Where the Magnitude of the interface value 505 is the same for the reading from the reference sample 200 and the tested material system, then the velocity of pulse travel through the lining is taken to be unchanged from the reference sample and any change in thickness of the lining can be calculated according to equation 4:

$$\text{Change in lining Thickness} = th_{210} \frac{t507_{210} - t507_{Test}}{t57_{200}} \quad (4)$$

Where:

$th_{210} \equiv$ Original thickness of lining 210 on reference sample $t507_{210} \equiv$ Time duration through lining 210 on reference sample $t507_{Test} \equiv$ time duration though lining on tested material b. Where the magnitude of the interface value 505 is not the same for the reading from the reference sample 200 and the tested material system, then the velocity of pulse travel through the lining is taken to be different from the reference sample. The velocity of pulse travel is calculated to solve equation 5:

$$A_{205}^{t506_{205}} = \text{Magnitude}_{505} \left| \frac{\frac{th_{205}}{0.5 \times t506_{205}} + V_{lt}}{V_{lt} - \frac{2 \times th_{205}}{t506_{205}}} \right| \quad (5)$$

Where:

$A_{205} \equiv$ The value of A for the substrate determined from equation 3 for reference sample $t506_{205} \equiv$ Value of time 506 for reflection 505 for the test reading $\text{Magnitude}_{505} \equiv$ magnitude of reflection 505 from the test reading $th_{205} \equiv$ Thickness of substrate 205

$Vlt \equiv$ velocity of pulse travel in lining being tested

5. Using the values determined from equations 4 and 5, the procedure shown in FIG. 6 can be used to find solutions for the readings. Where data from data storage module 350 is not able to provide a solution, those skilled in the art will be able to make a determination of possible adjustments until a solution is available.

For the condition where a reference sample as in FIG. 2 is available and the ultrasonic signal is applied to a substrate which has nominally the same mass density as a lining, the following general method may apply:
1. The ultrasonic transducer and instrumentation will be used with appropriate pulse width and excitation frequency to transit the substrate and subsequently transfer into the lining material, as in the example above.
2. Ultrasonic readings will be made on the reference sample. As noted above, readings can be taken from the area covered by lining and not covered by lining. Further, the surfaces of the reference sample will normally be exposed to ambient conditions and are not expected to match with the environment of the test material system.
3. Ultrasonic readings will be taken from the substrate and lining to be tested in a multiplicity of locations.
4. The readings from the tested substrate and lining system will provide values that can be entered into equation 3. The values are entered using the following general assumptions: the A value (shown as $A_i$ in equation 3) for the substrate will generally remain constant and the A value for the lining will be expected to change, and the T and R values may change as a result of changes that may occur to the sonic velocity of the lining. In this way the reference sample will be used to determine and quantify changes that have occurred to the tested substrate and lining. Equations 4 and 5 will be used as discussed above.
5. The method illustrated in FIG. 6 can then be followed to find a solution of equation 3. The changes to be determined from the readings include sonic velocity changes that have occurred in the tested material during its time exposed to service conditions and the depth at which these have occurred, and changes in the attenuation of the applied ultrasonic signal both in the substrate and the lining. The results of the calculations will include current thickness of the lining, depth into the lining that damage has occurred, the magnitude of damage that has occurred to the lining and the magnitude of the damage that has occurred to the substrate.

For the condition where a reference sample as in FIG. 2 is not available and the ultrasonic signal is applied to a substrate which has a higher mass density than a lining, the following general method may apply.
1. The ultrasonic transducer and instrumentation will be used with appropriate pulse width and excitation frequency to transit the substrate and subsequently transfer into the lining material, as in the examples above.
2. Ultrasonic readings will be taken from the substrate and lining to be tested in a multiplicity of locations.
3. The readings from the tested substrate and lining system (values for time and magnitude obtained directly from the readings) can be entered into equation 3. In this case, the solution will use the general assumption that the A value for the substrate will remain constant and the A value for the lining will be expected to change. The procedure illustrated in FIG. 6, including values which may be available in the data storage module 350, can be used to generate solutions to equation 3. Using values from the storage module 350, when available, will typically allow determination of the damage to the lining and substrate.
4. Generally speaking, data from all the readings will be placed in the data storage module 350 for future evaluations. Solution of equation 3 is performed based on known parameters determined in experimental work to allow prediction of damage without needing a reference/calibration sample. Having a reference sample can provide more precise reference values and improved predictions but is not always required. If data is not available in the data storage module 350 that allows determination of damage, then additional testing and evaluation may be required to establish the relationship between the data acquired and the condition of the material system.
5. For some material systems, there may exist theoretical or empirical relationships between ultrasonic results including the parameters derived from solution to equation 3 and some objective criterion. One example is the use of ultrasound to determine the current flexural modulus of fiber reinforced polymer materials based on an established relationship and without requirement for a reference sample. In these cases, data relating the objective criterion to the ultrasonic results may be stored in the data storage module 350. From this, prediction of the rate of damage progression may be made with resulting prediction of service life.

6. Data from storage module 350 can be used to provide comparison data/values to determine and quantify changes that may have occurred to the tested substrate and lining. The results may include characteristics such as expected current thickness of the lining, depth into the lining that damage has occurred, the magnitude of damage that has occurred and the like. These values can be determined from the transit time and attenuation that has occurred in the ultrasonic readings based on the noted equations.

For the condition where a reference sample is not available and the ultrasonic signal is applied to a substrate which has nominally the same mass density as a lining, the following general steps apply.

1. The ultrasonic transducer and instrumentation will be used with appropriate pulse width and excitation frequency to transit the substrate and subsequently transfer into the lining material.
2. Ultrasonic readings will be taken from the substrate to be tested in a multiplicity of locations.
3. In this circumstance, it is reasonable that if no damage has occurred to the lining, the interface between the lining and the substrate may not be detected in the ultrasonic reading, due to the similar mass densities.
4. Values for time and magnitude obtained directly from the readings will be used along with initial assumption that the A value for the substrate will remain constant when an interface between the lining and substrate exists and the A value for the lining will be expected to change.
5. The method described above to solve equation 5 and using values from storage module 350 for velocity of pulse travel in the substrate will be used with the procedure illustrated in FIG. 6 to generate solutions to equation 3.
6. Where an interface is not detected, equation 3 can be solved for a single interface and should generally allow a closed form solution.
7. Data from the readings will be placed in the data storage module 350 for future evaluations. Where data is not available in the data storage module 350 that allows determination of damage, then additional testing and evaluation may be required to establish the relationship between the data acquired and the condition of the material system. Where data is available that relates the values determined from the readings, especially for the lining, to an objective criterion that may be within the data storage module 350 predictions can be made of damage progression within the lining without the reference sample. The objective criterion could be determined based on data that has accumulated from samples where the condition has been measured. An example of this is the use of ultrasound to determine the flexural modulus and thus the remaining service life of fiber reinforced polymer materials.
8. Data from storage module 350 will be used to provide comparison to determine and quantify changes that may have occurred to the tested substrate and lining. The changes to be determined from the readings include sonic velocity changes that have occurred in the tested material and the depth at which these have occurred, and changes in the attenuation of the applied ultrasonic signal both in the substrate and the lining. The results of the calculations will include current thickness of the lining, depth into the lining that damage has occurred, the magnitude of damage that has occurred to the lining and the magnitude of the damage that has occurred to the substrate.

Figure 7:
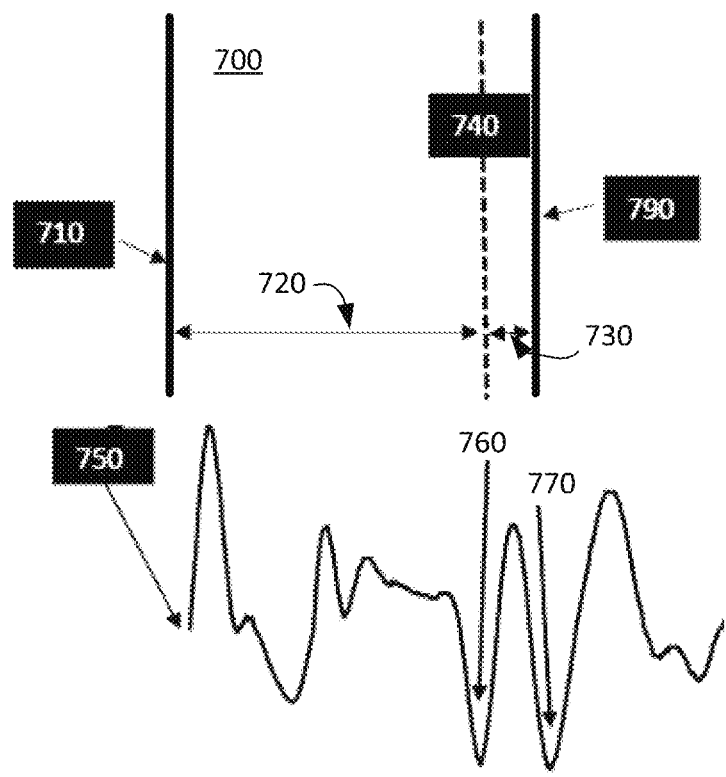
FIG. 7 illustrates an example where the analysis of the embodiment of FIG. 6 has been applied to a lining on a substrate.

FIG. 7 illustrates an example where equation 3 has been solved for an ultrasonic reading taken on a specimen 700. The figure shows a cross-section of the specimen 700 where the substrate 720 has mass density that is similar to the lining 730. The interface between the substrate and the lining is shown as 740. Thickness of the substrate 720 and lining 730 is shown. To take the ultrasonic reading that is to be used for solution of equation 3, the transducer is applied to the surface 710. The reading consists of the ultrasonic signal received as the ultrasonic pulse transits the material from 710 to 790. The ultrasonic reading is shown as a time versus received magnitude graph below the cross-sectional view. Incidence of the ultrasonic pulse is labelled as 750. Reflection from the interface 740 is shown as 760 and reflection from 790 is shown as 770.

Table 1 shows the values provided directly by the ultrasonic reading using Analysis Module 355. The labels in FIG. 7—760 and 770—are used as the subscript "i" used in equation 3. The solution described was developed from the ultrasonic information and only observations available from the surfaces 710 and 790 of the specimen 700. Observations from the cross-section of 700 were used after solution to verify results.

TABLE 1

| Reflection | Time ($10^{-6}$ s) | Magnitude |
|---|---|---|
| 760 | 10.93 | 0.130 |
| 770 | 13.58 | 0.139 |

This example shows solution of equation 3 for this reading using the method outlined in FIG. 6. With the values provided from Table 1, it was also known that the surface 790 was only in contact with air, therefore OSCF was assumed to be 0. Table 2 shows the values of sonic and material properties determined for this reading using storage module 355. The values in Table 2 are within limits that have been developed based on measurements from a suitably large population of material specimens.

TABLE 2

| Variable | Value | Source |
|---|---|---|
| $OSCF_{770}$ | 0 | Observation - air on opposite surface |
| $f_{760}$ | 1.0 | Assumed |
| $A_{720}$ | 0.940 | Storage Module 350 |
| $R_{770}$ | −1.0 | 100% reflection at air interface |
| $T_{760, 770}$ | 1.26 | Equation 5 and storage module 350 |
| $T_{770, 760}$ | 0.74 | Equation 5 and storage module 350 |

The computations involve determining the differences in the sonic velocities between the materials on either side of the interface 740. In this particular case, the reflection 760 was detected primarily because the lining 730 has a slower sonic velocity than the substrate 720 and the sonic velocity values were determined by incorporating conventional equations for ultrasonic sound transmission to determine "T" and "R" within equation 3. Table 3 includes the values for sonic velocity that were determined for this example. These sonic velocity values have been confirmed to be reasonable based on empirical data that has been used to provide data to the storage module 350.

TABLE 3

| Variable | Value | Description |
|---|---|---|
| $V_{720}$ | 3.52 | Sonic velocity of substrate |
| $V_{730}$ | 2.08 | Sonic velocity of lining |

The final part of the solution of equation 3 produces the "A" value for the lining. For many polymers, the "A" value of the undamaged material can be considered to exist in a reasonable range of values. As discussed above, damage to a polymer lining can change the material and this corresponds to changes in the "A" value. In this way, the value determined for the lining 730 also corresponds to the damage state of the lining. The sonic velocity of the lining and the time between 760 and 770 is used to determine the depth of the lining. The values for A730 and the depth of the lining are listed in Table 4. Note that the depth value in Table 4 is 2.75 mm and the measured value from the cross-section of e the specimen was 2.5 mm—showing the ultrasonic value to be within 10% of the measured value.

TABLE 4

| Variable | Value | Description |
|---|---|---|
| $A_{730}$ | 0.629 | For lining |
| Depth | 2.75 | mm. Compared to measured depth of 2.5 mm |

Figure 8:
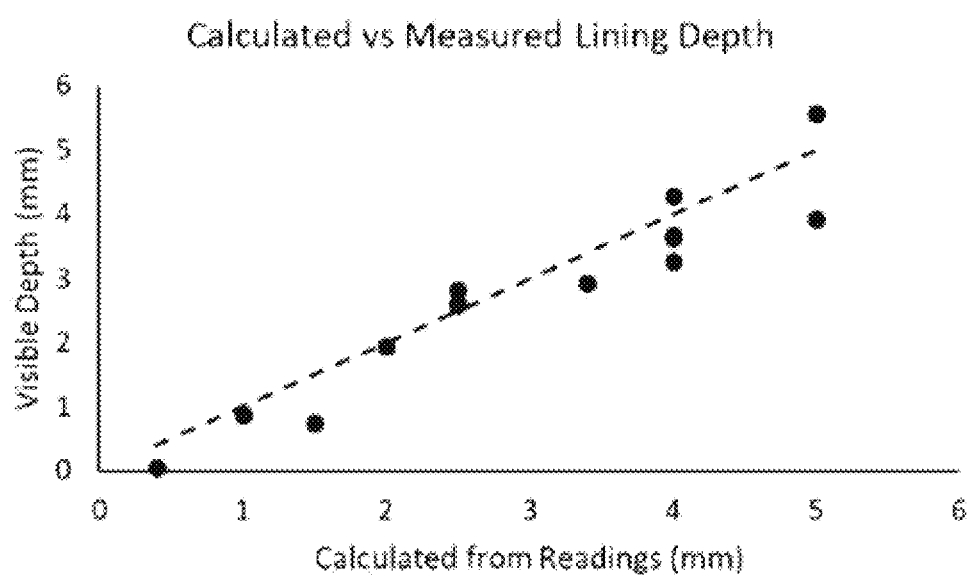
FIG. 8 is a graph comparing non-destructive ultrasonic results with measurements on specimens.

FIG. 8 shows a graph that shows a comparison of lining depth calculated from using the method illustrated here on ultrasonic readings to measured depth from cross-sections. Correlation of the data is 0.95, where 1.0 corresponds to a perfect match.

For the condition where the ultrasonic signal may be applied to a lining and the lining may have lower mass density than a substrate, the following general steps apply. In this circumstance, the term "lining" can be used interchangeably with; an exterior coating or lining that has been applied to a substrate to protect it from environmental conditions or non-metallic structural reinforcement that has been applied to a metal substrate. This situation may also occur where inspection must be completed from the inner surface of a lined container, or other circumstances which may arise.

1. The ultrasonic transducer and instrumentation will be used with appropriate pulse width and excitation frequency to transit and subsequently transfer into the lining material.
2. Ultrasonic readings will be taken from the lining surface to be tested in a multiplicity of locations.
3. Values for time and magnitude obtained directly from the readings will be used along with initial assumption that the A value for the substrate will remain constant and the A value for the lining will be expected to change.
4. The method illustrated in FIG. 6, in particular including values available in the data storage module 350 will be used with data obtained directly from the reading to generate solutions to equation 3.
5. Data from the readings will be placed in the data storage module 350 for future evaluations.
6. Data from storage module 350 will be used to provide comparison to determine and quantify the condition of the tested lining. This may include assessment of bonding to the substrate, polymerization and cross-linking of the lining and degree of cure.
7. Other values may be determined from the readings including sonic velocity and the depth at which these have occurred, and changes in the attenuation of the applied ultrasonic signal both in the substrate and the lining. The results of the calculations will include current thickness of the lining, depth into the lining that damage has occurred, the magnitude of damage that has occurred to the lining and the magnitude of the damage that has occurred to the substrate.
8. Values that have been found to provide real solutions to equation 3 may be stored in the data storage module 350 to provide statistical data on distribution of values and subsequently provide accelerated solutions in future analyses.

The results calculated for the readings may then be analyzed to determine changes in the materials that have reasonable probability of occurrence. As an example, the goal of an analysis could be to make calculations to determine changes that have occurred to the lining or to the substrate. Another purpose of the calculations may be to determine the rate that certain changes have occurred to the lining so that predictions of future condition may be possible.

According to an aspect herein, there is provided a system to evaluate a lining bonded to a substrate, the system comprising: an ultrasonic transmitter configured to provide ultrasonic pulses to the substrate or the lining; an ultrasonic receiver configured to receive ultrasonic signal data related to the pulses; a filter module configured to receive the ultrasonic signal data from the ultrasonic receiver and filter the ultrasonic signal data; a processing module configured to process the filtered ultrasonic signal data; a data storage module for storing: data related to the lining and the substrate; ultrasonic signal data; parameters based on empirical data; and reference values related to the lining and the substrate; an analysis module configured to analyze the processed ultrasonic signal data by: calculating magnitude, sonic velocity, transit time, attenuation, thickness and depth values from each signal; assembling the values into a function; identifying parameters such as thickness, sonic velocity, attenuation related to the materials in the specimen; using values provided by the data storage module as part of the calculations; evaluate the distribution of results after parameters are calculated for ultrasonic signals provided by the processing module; adjust parameters as required so that the results and parameters are distributed in a manner that is representative of empirical distributions; provide data to the data storage module; and an output module configured to output the results of the analysis.

In some cases, the system may further include a memory component configured to store ultrasonic signal data and configuration data regarding the lining and substrate that is tested.

In some cases, the filter module may be configured to extract relevant data from the ultrasonic signal data. In this case, the relevant data may include data associated with the lining and substrate being tested and data associated with the ultrasonic transmitter and receiver. In this case, the relevant data may include magnitudes of reflections from various locations where lining and substrate properties vary. In this case, the relevant data may include the relative time at which a reflection magnitude occurs.

In some cases, the data storage module may be configured to contain specific data relating to the individual materials that may be part of the lining and substrate that is tested. In some cases, the data storage module may be configured to contain specific data relating to ultrasonic velocities. In some cases, the data storage module may be configured to contain specific data relating to the transmission of ultrasonic pulses within individual materials. In some cases, the data storage module may be configured to contain specific data relating to the effect of substances in contact with the opposite surface of the lining and substrate.

In some cases, the analysis module may be configured to determine the extent of damage to a polymer lining. In some cases, the analysis module may be configured to apportion damage to the substrate and lining. In some cases, the analysis module may be configured to determine the sonic velocity of the material between two interfaces in the material system. In some cases, the analysis module may be configured to determine the changes in ultrasonic signal magnitude that occur as the ultrasonic pulse transits the material between interfaces. In some cases, the analysis module may be configured to determine the effect of a substance in contact with the opposite surface of the lining and substrate. In some cases, the analysis module may be configured to determine the fraction of an ultrasonic pulse that has been transmitted across an interface. In some cases, the analysis module may be configured to determine the depth of damage that has occurred to a polymer lining on a substrate. In some cases, the analysis module may be configured to determine a value that is related to the condition of the polymer lining. In some cases, the analysis module may be configured to update the data storage module.

In some cases, the output module may be configured to provide data related to the depth of damage to the polymer in a lining. In some cases, the output module may be configured to provide data related the condition of the polymer lining. In some cases, the output module may be configured to provide data in a digital format for use by computer programs.

According to an aspect herein, there is provided a method to evaluate the condition of a lining bonded to a substrate, the method comprising: taking ultrasonic signal data from the substrate or the lining; receiving the ultrasonic signal data, at an ultrasonic receiver; filtering the ultrasonic data, at a filter module; processing the filtered ultrasonic signal data, at a signal processing module; storing data related to the ultrasonic signals in a storage module, wherein the storage may include: data input from those skilled in the art; values for parameters that are required for use in data analysis; values for parameters that may be been determined for a particular specimen of substrate and lining; analyzing the processed ultrasonic signal data, at an analysis module, wherein the analysis may include: extracting values from each signal; assembling the values into a function; identifying unknown parameters related to the materials in the particular specimen; using values provided by the data storage module as part of the calculations to find a real numerical solution of the function that corresponds to the processed ultrasonic signal data; evaluating the distribution of results after parameters have been calculated for ultrasonic signals provided by the processing module; adjusting parameters as required so that the results and parameters are distributed in a manner that is representative of empirical distributions; and providing data to the data storage module; and providing the results for all ultrasonic signals, at an output module.

In some cases, the method may further include storing ultrasonic signal data and configuration data regarding the particular lining and substrate that is tested. The method may include storing specific data relating to the ultrasonic velocities and transmission of ultrasonic pulses for individual materials that may be part of the lining and substrate that is tested.

In some cases, the filtering may include extracting relevant data from the ultrasonic signal data. The relevant data may include data associated with the lining and substrate being tested and the extracted data may include data associated with the ultrasonic transmitter and receiver. The relevant data may include magnitudes of reflections and their relative times from various locations where lining and substrate properties vary. In some cases, the filtering of the ultrasonic signal data may determine the changes in ultrasonic signal magnitude that occur as the ultrasonic pulse transits the material between interfaces.

In some cases, the method determines the effect of a substance in contact with the opposite surface of the lining and substrate. In some cases, the method determines the fraction of an ultrasonic pulse that has been transmitted across an interface. In some cases, the method determines the depth of damage that has occurred to a polymer lining on a substrate. In some cases, the method determines a value that is related to the condition of the polymer lining. In some cases, the method provides data related to the depth of damage to the polymer in a lining. In some cases, the method provides data related to the condition of the polymer lining.

According to another aspect herein, there is provided a system and method for evaluation of material systems including linings (e.g. elastomers, polymers or the like) that are applied to substrates, the system and method including: an ultrasonic transducer configured to apply longitudinal compression pulses to the surface of the lining or to the substrate, an ultrasonic receiver configured to receive ultrasonic data related to the ultrasonic pulses, a filter module configured to filter the ultrasonic signal data, a signal processing module configured to process the filtered ultrasonic signal data, an analysis module configured to analyze the processed ultrasonic signal data by: calculating a number of characteristic values based on the processed ultrasonic signal data; comparing the calculated characteristic values with reference values and correlation of differences to known responses to damage; and determining the condition of the material system; and an output module configured to output the condition of the material system.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Applicants reserve the right to pursue any embodiments or sub-embodiments or combinations thereof disclosed in this application; to claim any part, portion, element and/or combination thereof, including the right to disclaim any part, portion, element and/or combination thereof.

The above-described embodiments are intended to be examples only. Alterations, modifications and variations can be effected to the particular embodiments by those of skill in the art. The scope of the description should not be limited by the embodiments set forth herein, but should be construed in a manner with the specification as a whole.

I claim:

1. A system to evaluate the condition of a material system comprising a lining bonded to a substrate, the system to evaluate the condition of the material system comprising:
   an ultrasonic transmitter configured to provide an ultrasonic pulse to the material system;
   an ultrasonic receiver configured to receive ultrasonic signal data related to the pulses;
   a data storage module configured to store data related to the material system, ultrasonic pulse and empirical data;
   an analysis module configured to analyze the ultrasonic signal data based on the ultrasonic pulse, the data related to the material system and empirical data;
   determine the sonic velocity of the material between two interfaces in the material system;
   determine the changes in ultrasonic signal magnitude that occur as the ultrasonic pulse transits the material between interfaces;
   determine the effect of a substance in contact with the opposite surface of the lining and substrate;
   determine the fraction of an ultrasonic pulse that has been transmitted across an interface;
   determine the depth of damage that has occurred to a polymer lining on a substrate;
   determine a value that is related to the condition of the polymer lining; and
   update the data storage module; and
   an output module configured to output the results of the analysis.

2. A system according to claim 1 wherein the system further comprises a filter module to extract relevant data from the ultrasonic signal data.

3. A system according to claim 2, wherein the relevant data comprises data associated with the lining and substrate being tested.

4. A system according to claim 2, wherein the relevant data comprises magnitudes of reflections from various locations where lining and substrate properties vary.

5. A system according to claim 2, wherein the relevant data comprises the relative time at which a reflection magnitude occurs.

6. A system according to claim 1, wherein the data storage module is further configured to:
   store specific data relating to the ultrasonic velocity that should be expected for individual materials that may be part of the lining and substrate that is tested;
   store specific data relating to the transmission of ultrasonic pulses within individual materials that may be part of the lining and substrate that is tested; and
   store specific data relating to the effect of substances in contact with the opposite surface of the lining and substrate.

7. A system according to claim 1, wherein the depth of damage that has occurred to the polymer lining or the value that is related to the condition of the polymer lining are provided in a digital format for use by computer programs.

8. A method to evaluate the condition of a lining bonded to a substrate, the method comprising:
   taking ultrasonic signal data from the substrate or the lining;
   receiving the ultrasonic signal data, at an ultrasonic receiver;
   storing data related to the ultrasonic signal data in a storage module, wherein the stored data comprises:
      values for parameters that are required for use in data analysis; and
      values for parameters that may be been determined for a particular specimen of substrate and lining;
   analyzing the ultrasonic signal data, at an analysis module, based on the ultrasonic signal data and the data related to the ultrasonic signal data;
   determining the effect of a substance in contact with the opposite surface of the lining and substrate;
   determining the fraction of an ultrasonic pulse that has been transmitted across an interface
   determining the depth of damage that has occurred to a polymer lining on a substrate;
   determining a value that is related to the condition of the polymer lining;
   providing data related to the depth of damage to the polymer in a lining; and
   providing data related to the condition of the polymer lining; and
   displaying the results at an output module.

9. A method according to claim 8, the method further comprising filtering the ultrasonic signal data to extract relevant data from the ultrasonic signal data.

10. A method according to claim 8 wherein the analysis of the ultrasonic signal data comprises:
    extracting values from each signal;
    assembling the values into a function;
    identifying unknown parameters related to the materials in the particular specimen;
    using values provided by the data storage module as part of the calculations to find real values of the unknown parameters that will provide a real numerical solution of the function that corresponds to the processed ultrasonic signal data;
    evaluating the distribution of results after parameters have been calculated for all ultrasonic signals provided by the processing module; and
    adjusting parameters as required so that the results and parameters are distributed in a manner that is representative of empirical distributions.

11. A method according to claim 8 further comprising:
    determining the changes in ultrasonic signal magnitude that occur as the ultrasonic pulse transits the material between interfaces.

12. A method according to claim 8 wherein the method is implemented as a computer program provided on a special purpose or generic computer for executing the method and using data in a digital format.

* * * * *